United States Patent [19]

Ehrlich

[11] 3,873,395
[45] Mar. 25, 1975

[54] APPARATUS FOR FORMING LAMINATED WALL STRUCTURES

[75] Inventor: Donald J. Ehrlich, Monon, Ind.

[73] Assignee: Monon Trailer Inc., Monon, Ind.

[22] Filed: Mar. 5, 1973

[21] Appl. No.: 337,958

[52] U.S. Cl. ............ 156/382, 100/211, 144/281 R, 144/283, 144/313, 144/313 C, 156/582
[51] Int. Cl. ........................................... B32b 31/20
[58] Field of Search ............ 156/87, 228, 182, 285, 156/286, 288, 381, 382, 580, 581; 100/208, 209, 211; 144/281 R, 281 A, 281 E, 283, 313

[56] References Cited
UNITED STATES PATENTS

| | | | |
|---|---|---|---|
| 535,673 | 3/1895 | Clayton | 144/281 R |
| 1,206,656 | 11/1916 | Benedictus | 144/281 R |
| 2,519,661 | 8/1950 | Johnson | 156/580 |
| 3,681,171 | 8/1972 | Hojo et al. | 156/382 |

*Primary Examiner*—Charles E. Van Hor
*Assistant Examiner*—Caleb Weston
*Attorney, Agent, or Firm*—Olson, Trexler, Wolters, Bushnell & Fosse

[57] ABSTRACT

The embodiment of the invention disclosed herein is directed to a method and apparatus for forming laminated wall structures which can be used to build trailer truck bodies, or the like. The method comprises a sequence of steps incuding placing laminate sheet material on a support table, covering the sheet material with plywood panels, and then covering the panels again with plastic sheet material. The laminated structure is then covered with a movable platen which is lowered into position in a manner automatically to spread the laminated materials and bonding agents from the center out toward the edges. The spreading or squeezing action is accomplished by straightening of the platen.

5 Claims, 5 Drawing Figures

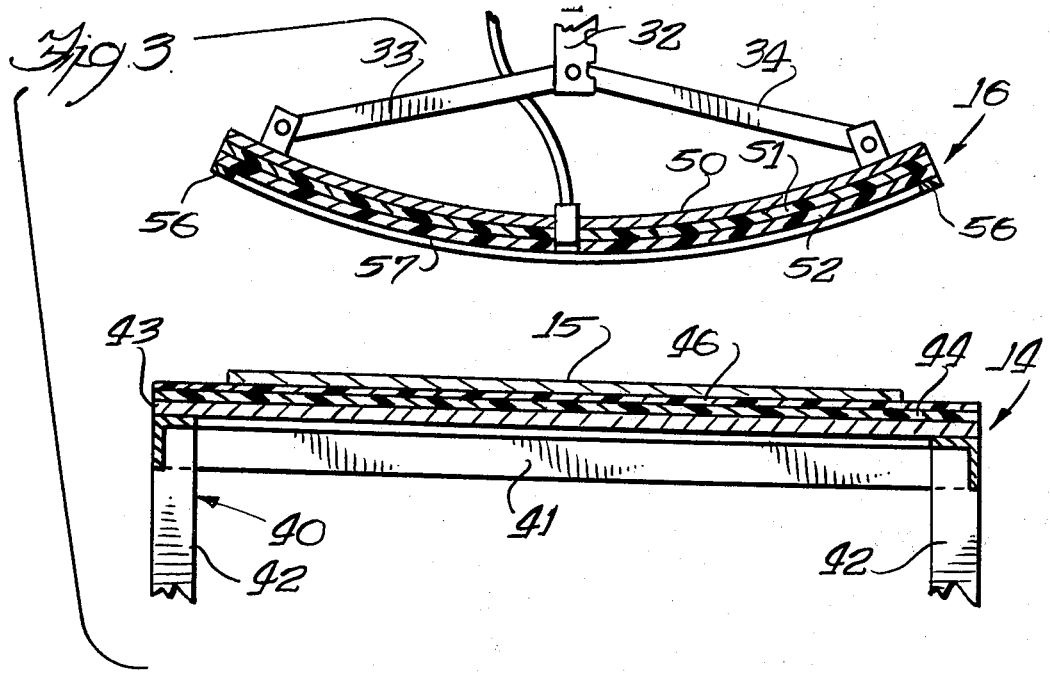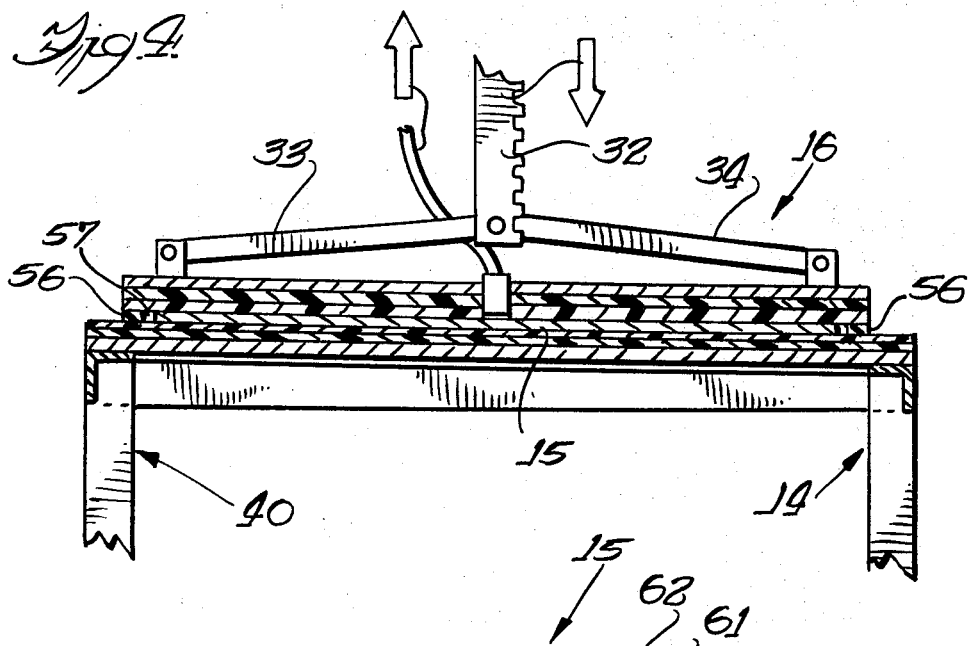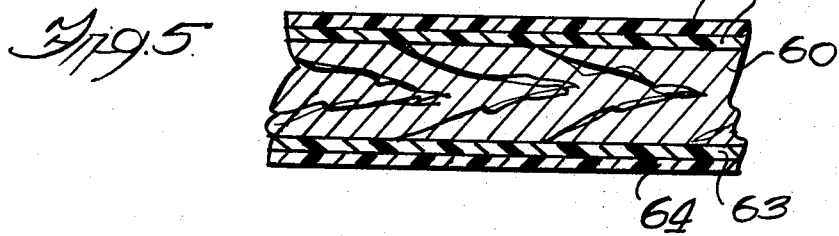

APPARATUS FOR FORMING LAMINATED WALL STRUCTURES

BACKGROUND OF THE INVENTION

This invention relates generally to a method and apparatus for forming laminated wall structures, and more particularly to forming wall structures of plastic coated wood panels which can be used as side walls of trailer truck bodies, or the like.

The transport of goods by use of trailer trucks is a well known and recognized necessity within industrial societies. Large trailer trucks many times are the only means of transporting goods from place to place. The cost of shipping goods in trailer trucks is determined by such things as the overall weight of the vehicle, including the weight of the trailer itself. Large trailer trucks constructed of steel frames and sheet metal sides are relatively strong for the purpose intended but they themselves add substantial weight to the axles, thus causing increased wear and tear on the tires and road surface over which they travel. Such metal trailer truck bodies also have the disadvantage in that during loading and unloading thereof cartons and palletes, by use of fork lifts, the fork lifts many times inadvertenetly bump into the interior wall surface of the trailer thus causing a dented appearance at the outside surface of the wall. The wear and tear of normal use of a metal trailer truck body causes the paint to chip off and the metal will eventually rust through. Thus not only gives a displeasing appearance to the trailer body but also weakness the body.

It has been found that trailer bodies having wood side walls have substantial advantages over the metal bodies heretofore utilized. Such wood bodies are more resilient to bumps within the interior of the body so that the exterior of the body does not become dented. Also, wood panel truck bodies and trailer bodies are lighter in weight than their steel predecessors. However, to maintain an economic advantage in manufacturing wood panel truck bodies it is important to reduce the amount of time and cost required to fabricate the laminated wall structures which form the truck bodies.

SUMMARY OF THE INVENTION

Accordingly, it is an object of this invention to provide an improved method and apparatus for forming laminated wall structures which can be used in manufacturing truck and trailer bodies.

Another object of this invention is to provide an improved apparatus for forming laminated wall structures, which apparatus is easy to manipulate by a minimum number of workmen so as to achieve maximum efficiency during manufacture.

A feature of this invention is the use of a movable suspended upper platen which is constructed of relatively resilient members so that the platen bends upwardly at its edges when suspended by its lifting mechanism. The platen therefore takes an arcuate shape from side to side. Lowering the platen to come into contact with a laminated wall structure being fabricated on a support table will cause the distribution of weight of the platen to begin substantially in the center of the laminated structure and move toward the edges thereof along the side to side dimensions. This substantially and completely automatically squeezes out all of the air that may become entrapped within the laminated structure. Also it eliminates the need of workmen being extremely careful of air entrapment when laying laminated sheet material, thereby increasing production rate.

Many other objects, features, and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is an elevational end view of an apparatus constructed in accordance with this invention for manufacturing laminated wall structures for use with trailer truck bodies and the like;

FIG. 3 is an enlarged fragmentary sectional view showing a support table and suspended movable platen thereabove, and wherein the platen is arcuately configurated to provide an automatic squeezing out feature as it is lowered onto the laminated wall structure;

FIG. 4 is a fragmentary sectional view similar to that of FIG. 1 but with the top platen lowered in position and firmly engaging the support table to press the laminated structure together; and FIG. 5 is an enlarged fragmentary sectional view of a laminated wall structure constructed utilizing the method and apparatus of this invention.

DETAILED DESCRIPTION OF THE ILLUSTRATED EMBODIMENT

Figure 1:
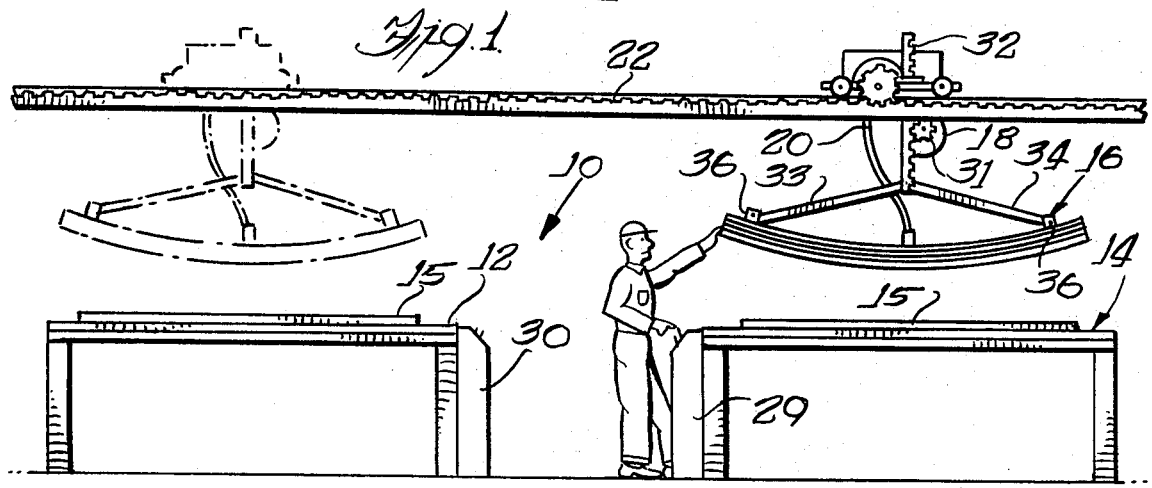
Figure 2:
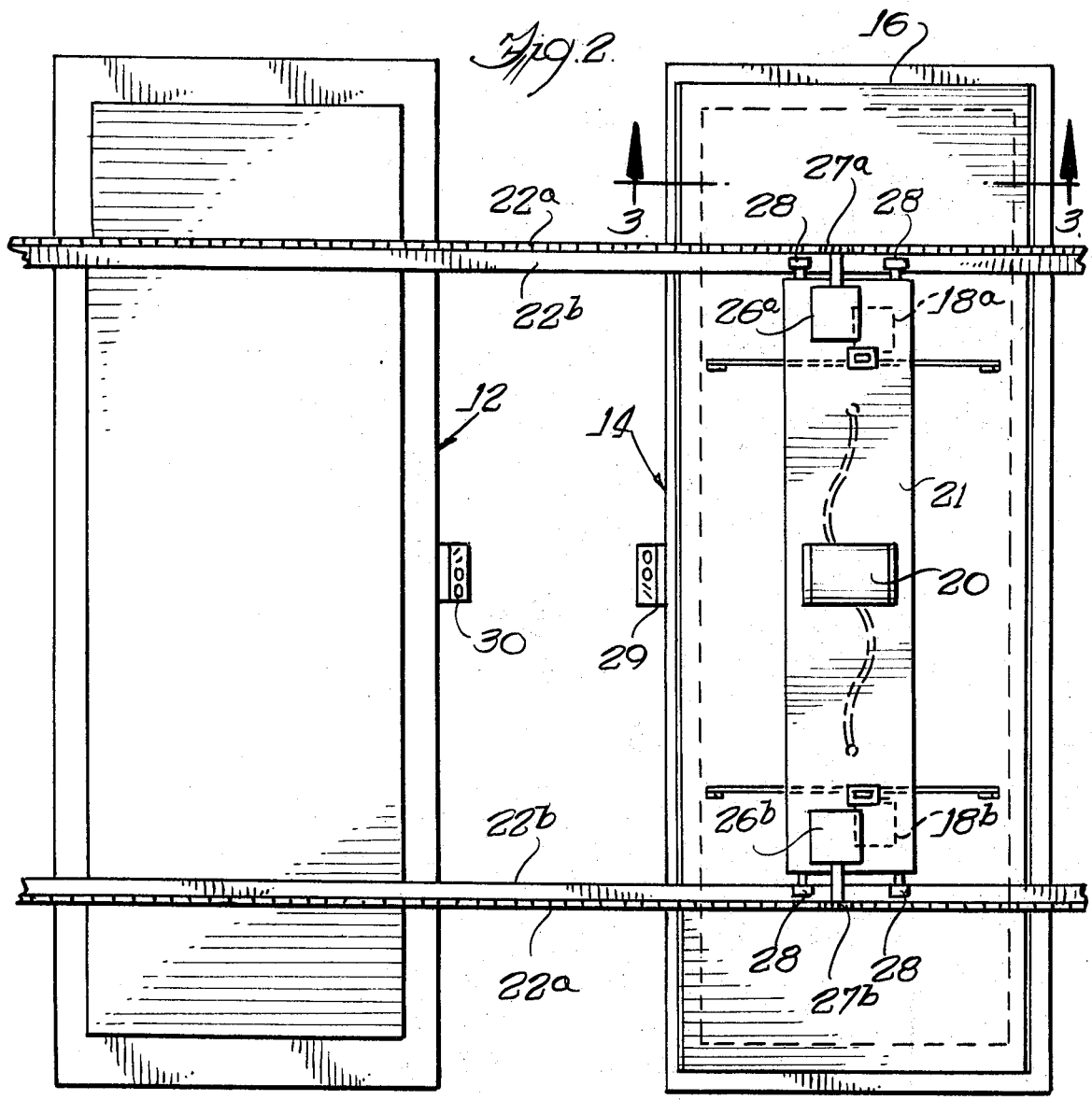
FIG. 2 is a top view of the apparatus of FIG. 1.

Referring now to FIGS. 1 and 2 an apparatus constructed in accordance with this invention is illustrated and designated generally by reference numeral 10. The apparatus 10 preferably includes a pair of support tables 12 and 14 onto which laminated structures 15 can be formed during a manufacturing process. A single movable platen 16 is suspended over the tables and movable in registry with each of the tables so that alternate manufacturer of laminated structure can take place. Therefore, while one of the tables is pressing a laminated structure 15 the other table can be prepared by placing the necessary laminated materials thereupon. After the pressing operation is finished over one table the top movable platen 16 can be transferred over the next table. The workmen then can remove the formed laminated structure 15 and again prepare the empty table for another forming operation.

The movable top platen 16 includes drive means 18a and 18b at spaced apart locations over the platen so as to raise and lower the platen uniformly over the laminated structure. In FIG. 1 the arcuate configuration of the platen structure 16 is exaggerated to illustrate that the platen is somewhat resilient when supported by its own weight. As the platen 16 is lowered into contact with the surface of the laminated structure 15 the center portion of the platen engages the laminated structure substantially at the center portion thereof during an initial contact therewith. Further lowering of the platen will cause a general squeezing out of any air bubbles or the like which may occur in the laminated materials, this squeezing action taking effect from the center of the structure and extending toward the edges thereof as illustrated by the diametrically opposed arrowed lines.

Once the upper platen 16 is fully positioned over the laminated structure 15, a seal is formed about the periphery of the upper platen and the support surface of the table 14. This seal provides an airtight chamber within the interior of the platen and a vacuum system 20 is in fluid communication with this chamber. A vacuum is applied to the interior chamber to substantially eliminate the internal pressure. This then causes the external atmospheric pressure to apply substantial force to the outside surface of the platen thereby squeezing together the laminated structure for a predetermined period of time so that a high pressure exists during the curing of the laminated materials. A suitable mold release spray or sheet material may be used in contact wth the support tables 12 and 14 and the interior surface of the platen 16 so as to readily separate from the laminated structure 15 being formed therein.

The apparatus of this invention is preferably used to form wall panels for trailer truck bodies and the like as set forth in my copending Patent Application Ser. No. 300,663 filed Oct. 25, 1972. These trailer truck wall panels are formed of a plurality of 4×8 panels of material such as plywood or the like. The 4×8 panels form a plurality of sub-panels each having opposite flat surfaces of substantial area and relatively thin edges with respect to the flat surfaces. The sub-panels are arranged so that a margin portion is defined about the periphery of the flat area immediately adjacent to the thin edges thereof. The 4×8 panels are then secured together, for example by gluing the flat surfaces of the opposite panels in contact with one another and with the marginal portions of sub-panels being laterally displaced but immediately adjacent to the thin edges thereof. These marginal portions of the sub-panels are then placed in registry with marginal portions of other sub-panels and glued together. The wood sub-panels are coated on opposite sides with laminating plastic material as illustrated in the above-mentioned copending patent application. This structure preferably is formed on the support tables 12 and 14 of FIGS. 1 and 2 and pressed together by the movable top platen 16 as a result of atmospheric pressure on the outside surface thereof.

The apparatus 10 includes a rack and rail structure 22a and 22b respectively, near one end of the pair of support tables and a parallel rack and gear structure 23a and 23b near the other end of the pair of support tables. Extending between the rack and gear members is an upper support unit 21 which holds the pair of spaced apart raising and lowering motor drives 18a and 18b which operates in unison. Also supported on the upper unit 21 is the vacuum system 20.

Located at each end of the upper unit 21 is a drive motor 26a and 26b which has a drive gear 27a and 27b, respectively, mounted on their output shafts. The drive gears 27a and 27b engage the racks 22a and 22b, respectively. Bearing rollers 28 are used to uniformly support the upper unit 21. To control the raising and lowering of the motors 18a and 18b, as well as the drive motors 26a and 26b, a control panel 29 is located at floor level at one side of the table 14 so that an operator can easily reach the controls while handling and viewing all of the operations of the apparatus. To facilitate control of the entire system a second control panel 30 is associated with the support table 12 so that the operator can have a parallel control to work from while standing at two different locations.

The raising and lowering motors 18a and 18b each has a gear 31 engaging a vertical gear rack 32 which, in turn, has a pair of support arms 33 and 34 pivotally connected to its lower end. The support arms 33 and 34 are connected to brackets 36 located at or near the side edges of the platen 16. By so supporting the platen 16 by outwardly directed arms 33 and 34 the platen will take a somewhat arcuate shape as illustrated in the drawings. As mentioned above this facilitates the outward squeezing of air from the center of the laminated structure towards its edges as the platen is lowered thereupon.

Referring now to FIGS. 3 and 4 a more detailed showing of the support table and movable platen is illustrated. The support table 14 may comprises an angle iron frame member 40 having an upper peripheral edge member 41 and a plurality of strategically located support legs 42. Placed upon the steel frame 40 is a wood table surface 43 preferably constructed of ¾ inch plywood sheets placed one next to the other along the entire length of the support table 14. Placed upon and secured to the plywood sheet 43 is a layer of hard fiberboard such as Masonite. A layer of polypropoline sheet material 46 is adhesively bonded to the layer of Masonite 44 and forms a mold release surface for the support table 14. Therefore, laminated articles being formed on the support table can be readily removed therefrom as a result of the smooth surface upon which the articles are fabricated. The Masonite layer 44 may be in the order of about ⅝ inch thick to provide substantial rigidness to the overal structure.

The top platen member 16 also comprises a ¾ inch plywood top structure 50 which is bonded a Masonite layer 51 which, in turn, is covered with polypropoline sheet material 52. As clearly seen in FIG. 3 the top platen 16 is arcuately configurated when in its suspended condition as a result of the outwardly extended support arms engaging the platen near its periphery rather than near or at its center portion.

To provide a seal about the edges of the laminated structure 15 a peripheral seal member 56 is placed about the platen and extends outwardly of the laminated structure so as to form a chamber 57 within the platen. As shown in FIG. 4 the top platen 16 is laid upon the laminated structure 15 and pressure applied thereto as a result of evacuating the chamber 57 with the vacuum system 20.

It will be noted in FIG. 4 that the combined overall length of the arms 33 and 34 is greater than the distance between their connections to the brackets 36. Therefore, when the depending rack member 32 is lowered to place the platen in position over the laminated structure 15 a pressure will be delivered at the seal members 56 as a result of the downward urging of the rack 32. This will insure that an initial seal condition exists about the entire periphery of the top platen as the vacuum is being drawn off. The application of the vacuum will ultimately apply sufficient pressure to flatten the seals 56 and maintain a completely airtight periphery.

Referring now to FIG. 5 an elevational sectional view of a fragmentary portion of the laminated structure 15 is illustrated. Here the laminated structure is formed of a plywood or other fiberwood center member 60 and covered with a pair of laminated sheet members 61 and 62 at the top portion thereof and a pair of laminated sheet members 63 and 64 at the bottom surface thereof. The laminated members 61, 62, 63, and 64 may be any suitable type, and may comprise a single layer or more than two layers on each side of the wood center portion as shown.

The method of this invention comprises placing the bottom plastic layer or layers 63 and 64 onto the large flat surfaces of the support table 14 which forms the bottom of the cavity or mold. A plurality of wood panel members 60 are placed over the first layers of plastic material 63, 64, and glued together. The top layers 61 and 62 are then placed over the wood panels with additional glue or resin. Once all of the laminated members are in place the laminated structure 15 is pressed together by lowering the top platen 16 onto the laminated structure so that a squeezing action occurs substantially from the center portion thereof and moves outwardly towards the edges as the platen is lowered so that air bubbles are removed.

While a single specific embodiment of the invention has been disclosed herein it will be understood that variations and modifications may be effected without departing from the spirit and scope of the novel concepts as set forth in the depending claims.

The invention is claimed as follows:

1. An apparatus for forming large generally rectangular laminated wall panels for trailer bodies and the like comprising a large substantially rigid rectangular bottom platen having a size and shape similar to a trailer body wall panel to be produced for supporting a wall panel thereon, a large rectangular resiliently bendable top platen similar in size and shape to said bottom platen, support means connected with the top platen for lowering said top platen to an operative position in registration with said bottom platen and for retracting the top platen to a raised position, seal means disposed around a peripheral portion of one of said platens for sealingly engaging the other of said platens when said top platen is lowered to said operative position, said support means being connected with opposite marginal portions of said top platen, a midportion of said top platen being substantially unsupported and bending downwardly from said opposite marginal portions under the top platens own weight when the top platen is in said raised position, said top platen upon being lowered to the operative position initially engaging a midportion of a panel on the bottom platen and then progressively bending and engaging the panel outwardly toward opposite margins thereof and also causing engagement of the seal means between the platens for defining a cavity between the platens, and means connected with said cavity for evacuating the cavity for causing ambiant air pressure to press the platens together and squeeze the panel therebetween.

2. An apparatus as defined in claim 1 wherein said support means comprises a pair of generally oppositely extending arms having first ends pivotally connected with a depending support member over a midportion of the top platen and opposite outer ends respectively pivotally connected with said opposite marginal portions of the top platen, said pair of arms having a total length greater than the distance between their connection to the top platen, downward movement of the depending member causing said arms to apply a downward pressure to the opposite margins of the top platen for insuring initial engagement of the seal means.

3. An apparatus according to claim 1 wherein said means for evacuating the cavity comprises suction means connected to the cavity through a midportion of said top platen for promoting initial squeezing of the workpiece between midportions of the platens.

4. An apparatus according to claim 1 wherein said seal means is secured around the periphery of said top platen.

5. An apparatus according to claim 1 which includes a second bottom platen substantially the same as said first mentioned bottom platen and disposed adjacent thereto in side by side relationship, said support means including a track structure extending over said first mentioned and said second bottom platens, a carriage movable on said track means between positions over said first mentioned and said second bottom platens, and a lifting mechanism carried by said carriage and connected with said top platen.

* * * * *